DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 4, 1975

931 O.G. 9

T931,004
RECONSTITUTED TOBACCO

Eugene D. Klug, Wilmington, Del., assignor to Hercules Incorporated, Wilmington, Del.

Filed Apr. 8, 1974, Ser. No. 459,248
Int. Cl. A24b *3/14*
U.S. Cl. 131—17 A
No Drawing. 4 Pages Specification

Reconstituted tobacco compositions are prepared using a tertiary amine group substituted ethyl cellulose, preferably diethylaminoethyl ethyl cellulose as a binder. The tertiary amine substituted ethyl cellulose dissolves in a slurry of tobacco fines acidified to a slightly acid pH. Upon drying of the slurry and removal of the acid, the diethylaminoethyl ethyl cellulose forms a binder for the tobacco which is insoluble and resistant to swelling in water. When the tobacco product is smoked, the binder does not dissolve or become slimy in the user's mouth.